(12) United States Patent
Peng

(10) Patent No.: US 9,606,014 B2
(45) Date of Patent: Mar. 28, 2017

(54) PRESSURE DETECTOR

(71) Applicant: Ta-Min Peng, Taipei (TW)

(72) Inventor: Ta-Min Peng, Taipei (TW)

( * ) Notice: Subject to any disclaimer, the term of this patent is extended or adjusted under 35 U.S.C. 154(b) by 66 days.

(21) Appl. No.: 14/797,306

(22) Filed: Jul. 13, 2015

(65) Prior Publication Data
US 2016/0334293 A1 Nov. 17, 2016

(30) Foreign Application Priority Data

May 12, 2015 (TW) .............................. 104207215 U

(51) Int. Cl.
*G01L 7/00* (2006.01)
*G01L 19/00* (2006.01)

(52) U.S. Cl.
CPC ............... *G01L 19/00* (2013.01); *G01L 7/00* (2013.01)

(58) Field of Classification Search
CPC .. G01L 19/00; G01L 7/00; G01N 3/12; G01F 23/162; G01F 1/74; G01F 1/00; G01P 13/02

USPC .. 73/700, 37, 299, 861.42, 861, 155, 170.07
See application file for complete search history.

(56) References Cited

U.S. PATENT DOCUMENTS

| 2009/0019939 A1* | 1/2009 | Shikata ............... G01L 19/0007 73/700 |
| 2011/0175716 A1* | 7/2011 | Medley ................ B60C 23/002 340/442 |

* cited by examiner

*Primary Examiner* — Lisa Caputo
*Assistant Examiner* — Nigel Plumb
(74) *Attorney, Agent, or Firm* — Cheng-Ju Chiang

(57) ABSTRACT

A pressure detector includes a passage casing, a fixing body, a sensing member, a sealing member, and a power supply member. The passage casing and the fixing body form a receiving space where the sensing member is disposed in. The sealing member is filled into the rest of the receiving space and separates the sensing member from the fixing body, and prevents a fluid to be measured coming from the chamber from leaking to outside space. The circuit board of the sensing member is protected from contacting the fluid to be measured directly. Thus, the accuracy of measuring pressure is improved, and the lifetime of the pressure detector is lengthened.

8 Claims, 4 Drawing Sheets

PRESSURE DETECTOR

CROSS-REFERENCE TO RELATED APPLICATION

This application claims priority to Taiwan Patent Application No. 104207215 filed May 12, 2015, the disclosure of which is hereby incorporated in its entirety by reference.

FIELD OF THE INVENTION

The present invention relates to a pressure detector, and more particularly to a pressure detector with high accuracy and long service life.

BACKGROUND OF THE INVENTION

A pressure detector is a device for detecting the pressure of gas, which is connected to a container with gas to be measured and performs pressure detection, by a sensing unit inside the pressure detector, that detects the pressure of the gas directly flowing from the container to the inside of the pressure detector. However, due to the problem that the gas to be measures dissipates easily through the intervals between the components of the pressure detector, the pressure detector often fails to obtain a correct pressure value. Moreover, the vapor or other corrosive material in the to-be-measured gas may corrode the circuit board inside the pressure detector easily, which leads to damage of the circuit board and less accurate detections, and also leads to a shortened lifetime of the pressure detector.

SUMMARY OF THE INVENTION

The present invention is for solving the disadvantages mentioned above and to provide a pressure detector with high accuracy and long service life.

To solve the problems in prior art, the present invention provides a pressure detector comprising a passage casing, a fixing body, a sensing member, a sealing member, and a power supply member. A chamber is provided within the passage casing, wherein a draining valve is disposed at a first end of the chamber for draining a fluid to be measured, and a draining aperture connected to the chamber is disposed on a side wall of the passage casing. The fixing body is disposed at an outer side of the passage casing by surrounding and covering the draining aperture to form an receiving space between the fixing body and the passage casing. The sensing member is disposed in the receiving space and includes a circuit board and a sensing module. The sensing module is provided on the circuit board and includes a sensing unit which has an opening connected to the draining aperture for sensing a pressure of the fluid to be measured. The sealing member is for filling the receiving space and separating the sensing member from the fixing body. The sealing member covers the sensor unit and the periphery of the draining aperture in such a manner that a sensing passage formed by the opening and the draining aperture is air-insulated from the circuit board and an outside space of the pressure detector by the sealing member. The power supply member is disposed on the fixing body and connected to the circuit board.

According to another aspect of the present invention, the fixing body includes a filling hole through which the outside space of the pressure detector is connected with the receiving space and through which the sealing member fills the receiving space. A fixing bolt is disposed in the filling hole by passing through the receiving space and being connected between the fixing body and the passage casing thereby fixing the fixing body on the passage casing.

According to another aspect of the present invention, the sensor member further includes a sleeve element which is sleeved and connected between the opening and the draining aperture.

According to another aspect of the present invention, an outer surface of a side wall of the passage casing has a groove in which the draining aperture in located.

According to another aspect of the present invention, the sensor member further includes a wireless member disposed on the circuit board, and the wireless member includes an antenna which extends downwardly along a direction substantially perpendicular to the plane of the circuit board.

According to another aspect of the present invention, the antenna includes a curve portion which extends along the rim of the fixing body.

According to another aspect of the present invention, a supplying valve is disposed at a second end of the chamber.

According to another aspect of the present invention, the pressure detector of the present invention further includes a cap member covering the fixing body, wherein the fixing body has an external screw thread, the cap member has an internal thread to which the external screw thread corresponds in such a manner that the cap member is screwed on the fixing body.

By the technical means of the present invention, the pressure detector provided by the present invention prevents fluid from dissipating through the intervals between the members of the pressure detector, and thus the accurate measurement of pressure is achieved. The demand for precise assembly is also decreased, which leads to production cost reduction. Furthermore, in the present invention, since the fluid to be measured only contacts the sensing member and will not flow to the circuit board, it can prevent the circuit board from corroding. Thus, the lifetime of the pressure detector is lengthened, and the circuit board can function without errors.

BRIEF DESCRIPTION OF THE DRAWINGS

The structure and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

The embodiments of the present invention are described below with reference to FIG. 1 to FIG. 4. The description is for describing the preferred embodiments of the present invention, and is not intended to limit the way of embodying the present invention.

Figure 1:
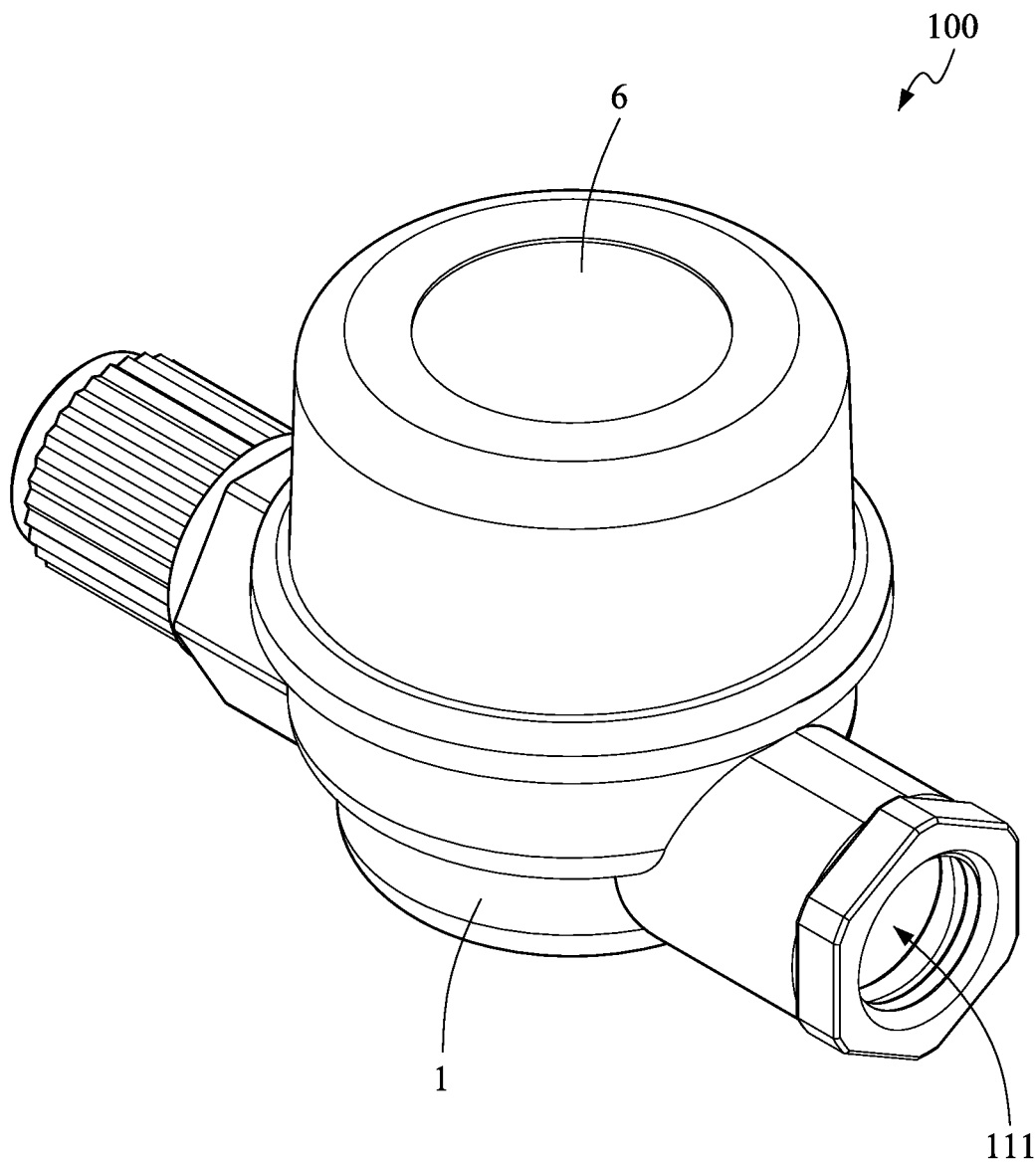
FIG. 1 is a perspective view diagram illustrating the pressure detector according to one embodiment of the present invention.
Figure 2:
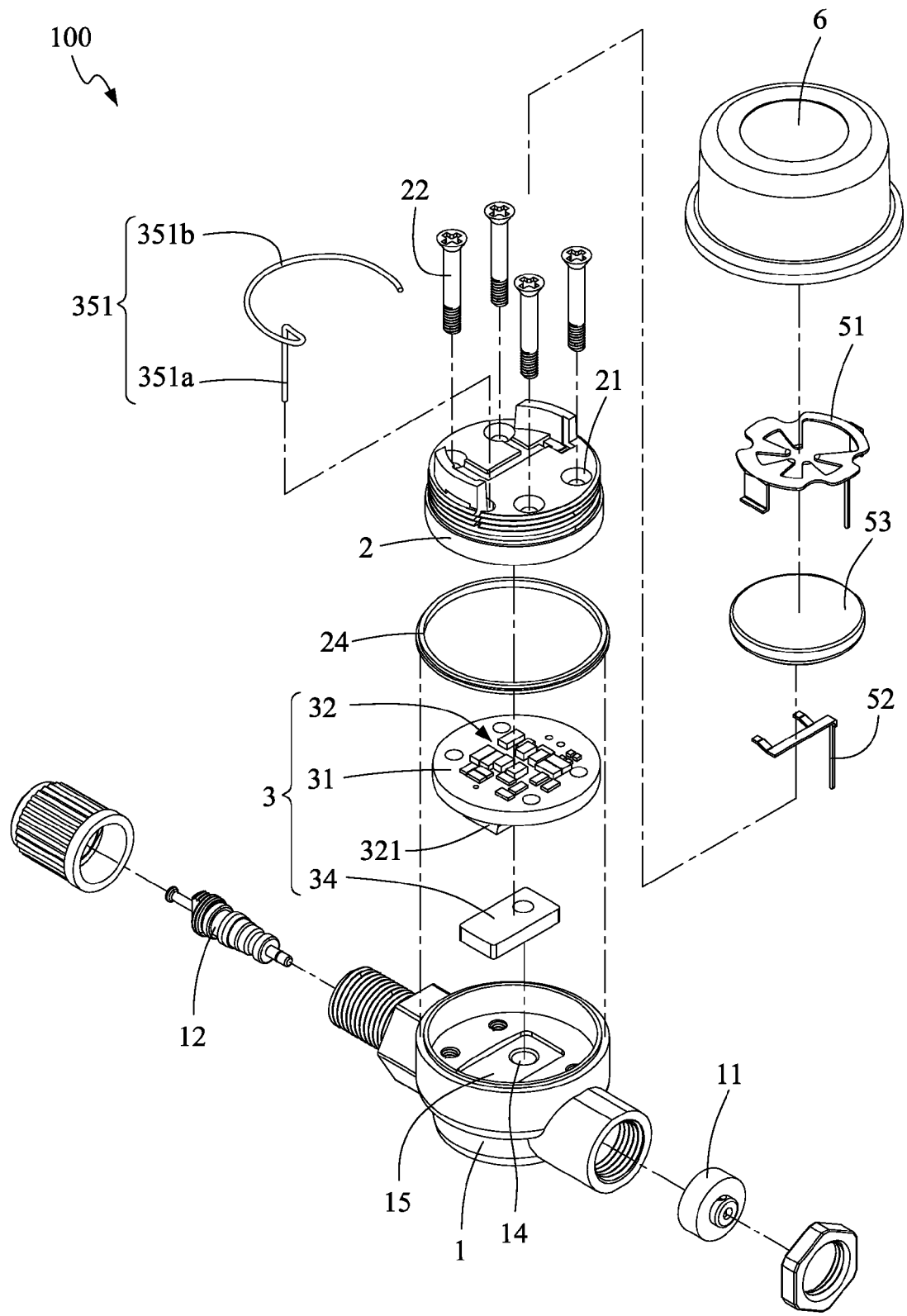
FIG. 2 is an exploded view diagram illustrating the pressure detector according to the embodiment of the present invention.

Refer to FIG. 1 to FIG. 4. FIG. 1 is a perspective view diagram illustrating the pressure detector according to an embodiment of the present invention. The pressure detector 100 comprises a passage casing 1, a fixing body 2, a sensing member 3, a sealing member 4, a power supply member 5, and a cap member 6.

The passage casing 1 is a hollow casing within which a chamber 13 is provided. The passage casing 1 is connected to a container (for example, a tire) with fluid to be measured and conducts the fluid to be measured from the container to the sensing member 3. A draining valve 11 is disposed at a first end of the chamber 13 for draining the fluid to be measured, and a draining aperture 14 connected to the chamber 13 is disposed on a side wall of the passage casing 1.

The fixing body 2 is disposed at an outer side of the passage casing 1, and the sensing member 3 and the power supply member 5 are disposed and fixed on a side of the passage casing 1 by the fixing body 2. The fixing body 2 surrounds and covers the draining aperture 14 to form an receiving space 23 between the fixing body 2 and the passage casing 1. A trench is disposed on the outer edge of the fixing body 2, and is surrounded by and combined with a rubber ring 24 for the receiving space 23 to be more closely insulated from the outer space.

The sensing member 3 is disposed in the receiving space 23, and includes a circuit board 31 and a sensing module 32. The sensing module 32 is provided on the circuit board 31 and includes a sensing unit 321. The sensing unit 321 has an opening 321a connected to the draining aperture 14 for forming a sensing passage P which is for the fluid to be measured to pass through. In other words, the fluid to be measured enters the chamber 13 from a passageway 111, and enters the sensing unit 321 via the sensing passage P. Then, the sensing module 32 can sense a pressure of the fluid to be measured. The fluid to be measured is not limited to gas, it can also be liquid or the mix of gas and liquid.

In general, compared with the capacity of containers with fluid to be measured, the capacity of the pressure detector 100 is very small. Thus, the fluid pressure variation generated by the pressure detector 100 can be omitted. After the fluid to be measured becomes stable inside the pressure detector 100, the sensing member 3 can measure an accurate pressure value.

Figure 4:
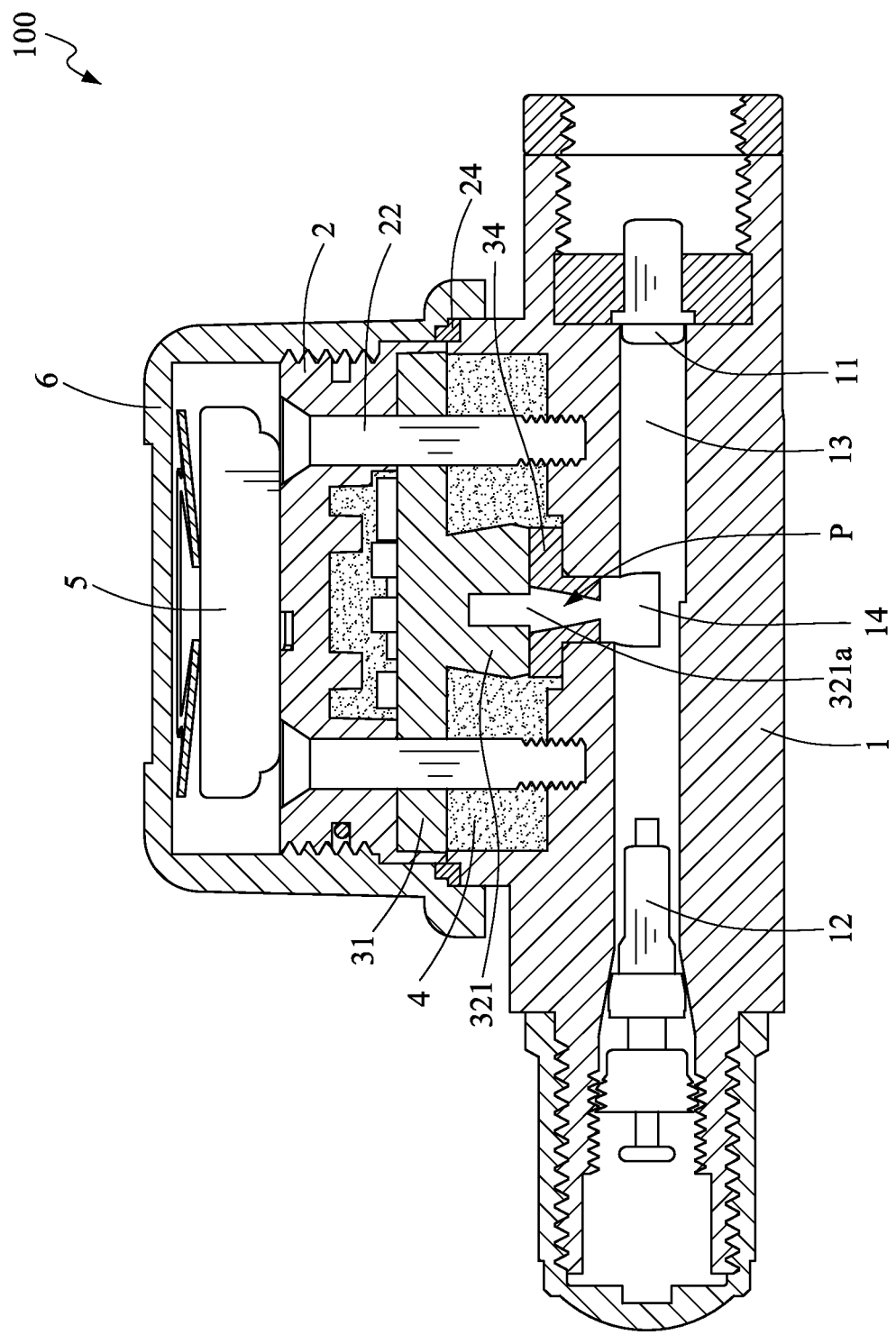
FIG. 4 is a cross-sectional view diagram illustrating the pressure detector according to the embodiment of the present invention.

As shown in FIG. 4, which is a cross-sectional view diagram illustrating a completely assembled pressure detector according to one embodiment of the present invention. The sealing member 4 is for filling the receiving space 23 and separates the sensing member 3 from the fixing body 2. The sealing member 4 covers the sensor unit 321 and the periphery of the draining aperture 14 in such a manner that a sensing passage formed by the opening 321a and the draining aperture 14 is air-insulated from the circuit board 31 and an outside space of the pressure detector 100 by the sealing member 4.

The power supply member 5 is disposed on the fixing body 2 and is connected to the circuit board 31 for supplying power to the sensing member 3. The power supply member 5 includes a first conductive element 51, a second conductive element 52, and a battery 53. An end of the first conductive element 51 and an end of the second conductive element 52 are inserted into the fixing body 2 individually, and extend to the circuit board 31 for electrically connecting to the circuit board 31. Another end of the first conductive element 51 and another end of the second conductive element 52 are individually and electrically connected to two electrodes of the battery 53.

The cap member 6 covers the fixing body 2 for capping inner members, such as the fixing body 2 and the power supply member 5, and for protecting the members from directly contacting the space outside the pressure detector 100. Furthermore, the fixing body 2 has an external screw thread, and the cap member 6 has an internal thread to which the external screw thread corresponds in such a manner that the cap member 6 is screwed on the fixing body 2.

Figure 3:
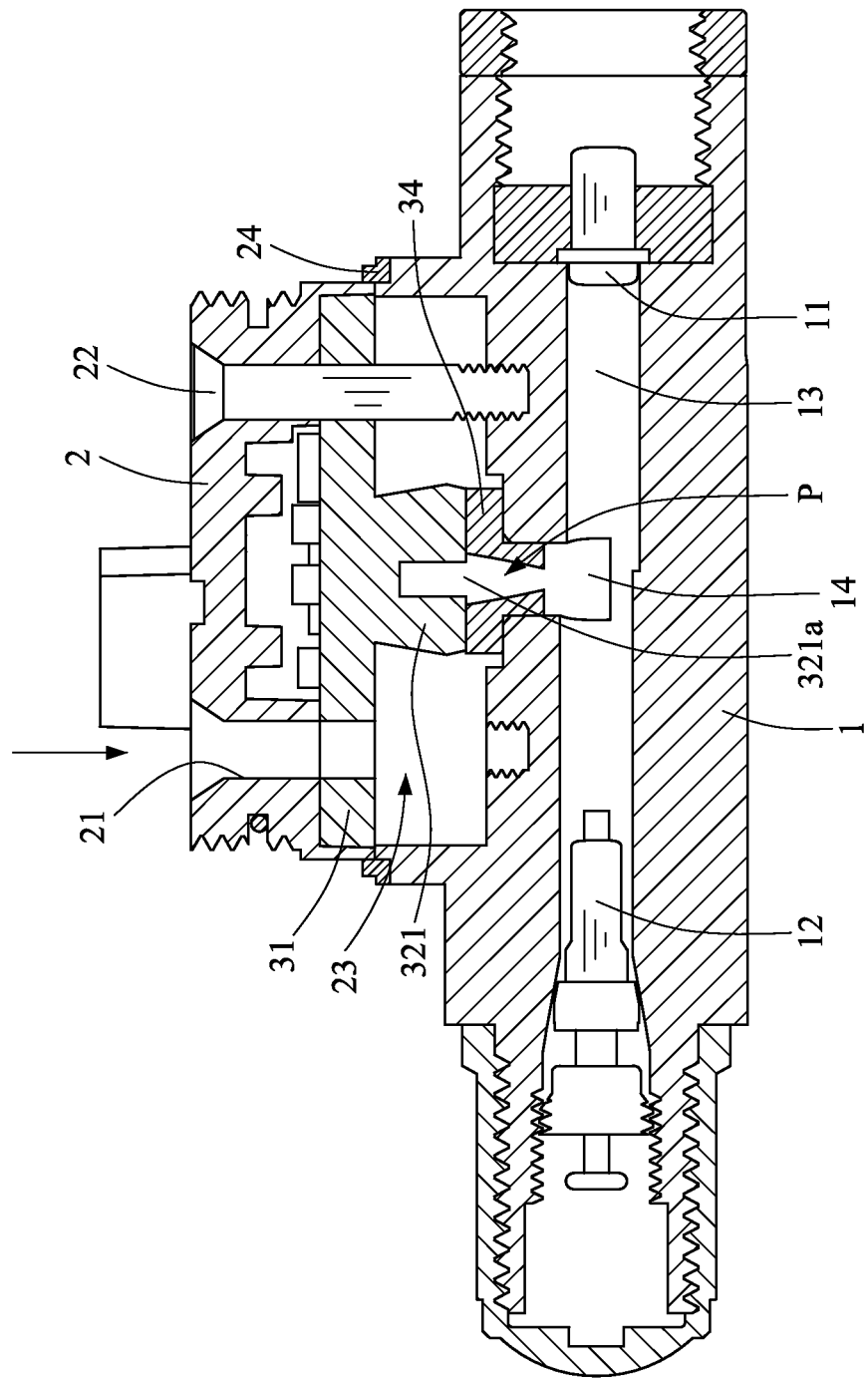
FIG. 3 is a schematic diagram illustrating the pressure detector according to the embodiment of the present invention, wherein the pressure detector is being assembled.

Please refer to FIG. 3, which is a schematic diagram illustrating the pressure detector according to the embodiment of the present invention, wherein the pressure detector is being assembled. The fixing body 2 further includes a filling hole 21 through which the outside space of the pressure detector 100 is connected with the receiving space 23 and through which the sealing member 4 fills the receiving space 23. A fixing bolt 22 is disposed in the filling hole 21 by passing through the receiving space 23 and being connected between the fixing body 2 and the passage casing 1, thereby fixing the fixing body 2 on the passage casing 1. In this embodiment, the fixing bolt 22 is a screw, and the filling hole 21 is a screw hole. However, the present invention is not limited to this.

The detail regarding how the sealing member 4 fills the receiving space 23 is explained below. The fixing body 2 includes a plurality of filling holes 21 and a plurality of fixing bolts 22 corresponding to the filling holes 21. First, the members shown in the FIG. 3 are assembled together. The plurality of fixing bolts 22 are disposed in the corresponding filling holes 21, and only one filling hole 21 is kept without the corresponding fixing bolt 22 passing through. Then, the filling hole 21 without fixing bolt 22 is used as an inlet for a sealing glue to enter the receiving space 23. Before the sealing glue solidifies completely, a fixing bolt 22 is disposed in the filling hole 21 which acted as an inlet of the sealing glue, and after the sealing glue solidifies, the injected sealing glue forms the sealing member 4. Finally, dispose the power supply member 5 and the cap member 6 above the fixing body 2, and then the pressure detector 100 is completely assembled.

Furthermore, the sensing member 3 includes a sleeve element 34 which is sleeved and connected between the opening 321 a and the draining aperture 14. The sleeve element 34 surrounds the sensing passage P for the fluid to be measured to flow to the opening 321a via the sensing passage P instead of diffusing into the receiving space 23. To facilitate the sealing process of sealing the contacting surface between the sleeve element 34 and the passage casing 1 by the sealing member 4, an outer surface of a side wall of the passage casing 1 has a groove 15 in which the draining aperture 14 in located. The inner edge of the groove 15 is slightly larger than the outer edge of the sleeve element 34. When the sleeve element 34 is disposed in the groove 15, the said sealing glue enters the receiving space 23 and tends to flow to the groove 15 which is low-lying. Therefore, the sealing glue clusters around the periphery of the contacting surface of the sleeve element 34. After the sealing glue solidifies and forms the sealing member 4, the sealing member 4 can seal the contacting surface between the sleeve element 34 and the passage casing 1.

The sensing member 3 further includes a wireless member 35 disposed on the circuit board 31, and the wireless member 35 includes an antenna 351 which extends downwardly along a direction substantially perpendicular to the plane of the circuit board 31 and thus forms a stick antenna.

The wireless member 5 is for transmitting data obtained by the sensing member 3 wirelessly, thereby making the pressure detector 100 becomes a wireless pressure detector.

Furthermore, except for a stick portion 351*a*, the antenna 351 also includes a curve portion 351*b* which extends along the rim of the fixing body 2. With the curve portion 351*b*, the wireless signals transmitted by the wireless member 35 can be strengthened and thus is easy to be received.

Furthermore, a supplying valve 12 is disposed at a second end of the chamber 13, and thus the pressure detector 100 in the present invention becomes a double-pass pressure detector. In detail, a supplied fluid can be provided by entering the second end of the chamber 13, and flowing into the container to be measured connected to the first end of via pressure detector 100. Besides, the pressure detector 100 can discharge the fluid to be measured from the container to the outside space via the second end of the chamber 13. Thereby, the pressure detector 100 can adjust the pressure of the fluid to be measured container according to the measured pressure value, in which the supplying valve 12 is a controlling valve for supplying or discharging fluid.

In summary, the pressure detector provided in the present invention prevents fluid from dissipating through the intervals between the members of the pressure detector, thus achieving accurate pressure measurement. The demand for precision and tolerance when assembling the pressure detector is also decreased, which leads to reduction of production cost. Furthermore, the fluid to be measured entering the passage after leaving the draining aperture, the sleeve element surrounding the sensing passage, and the sealing member filling the receiving space all prevent fluid to be measured from flowing to the circuit board, and thus protect the circuit board from corroding and damage. Therefore, the pressure detector of the present invention can have longer lifetime and circuit boards functioning without errors. In conclusion, the present invention provides a pressure detector 100 with technical advantages over conventional pressure detectors.

The above description should be considered as only the discussion of the preferred embodiments of the present invention. A person skilled in the art may make various modifications to the present invention. However, those modifications still fall within the spirit of the present invention and the scope defined by the appended claims.

What is claimed is:

1. A pressure detector, comprising:
   a passage casing within which a chamber is provided, wherein a draining valve is disposed at a first end of the chamber for draining a fluid to be measured, and a draining aperture connected to the chamber is disposed on a side wall of the passage casing;
   a fixing body disposed at an outer side of the passage casing by surrounding and covering the draining aperture to form an receiving space between the fixing body and the passage casing;
   a sensing member disposed in the receiving space and including a circuit board and a sensing module, wherein the sensing module is provided on the circuit board and includes a sensing unit which has an opening connected to the draining aperture for sensing a pressure of the fluid to be measured;
   a sealing member for filling the receiving space and separating the sensing member from the fixing body, wherein the sealing member covers the sensor unit and the periphery of the draining aperture in such a manner that a sensing passage formed by the opening and the draining aperture is air-insulated from the circuit board and an outside space of the pressure detector by the sealing member; and
   a power supply member disposed on the fixing body and connected to the circuit board.

2. The pressure detector of claim 1, wherein the fixing body includes a filling hole through which the outside space of the pressure detector is connected the receiving space and through which the sealing member is filled into the receiving space, and a fixing bolt is disposed in the filling hole by passing through the receiving space and being connected between the fixing body with the passage casing thereby fixing the fixing body on the passage casing.

3. The pressure detector of claim 1, wherein the sensor member further includes a sleeve element which is sleeved and connected between the opening and the draining aperture.

4. The pressure detector of claim 1, wherein an outer surface of a side wall of the passage casing has a groove in which the draining aperture in located.

5. The pressure detector of claim 1, wherein the sensor member further includes a wireless member disposed on the circuit board, and the wireless member includes an antenna which extends downwardly along a direction substantially perpendicular to the plane of the circuit board.

6. The pressure detector of claim 5, wherein the antenna includes a curve portion which extends along the rim of the fixing body.

7. The pressure detector of claim 1, wherein a supplying valve is disposed at a second end of the chamber.

8. The pressure detector of claim 1, further including a cap member covering the fixing body, wherein the fixing body has an external screw thread, the cap member has an internal thread to which the external screw thread corresponds in such a manner that the cap member is screwed on the fixing body.

* * * * *